United States Patent
Kunysz

(10) Patent No.: US 8,249,128 B2
(45) Date of Patent: Aug. 21, 2012

(54) ENHANCED ULTRA WIDE BAND SIGNAL DETECTION USING AN ULTRA WIDE BAND KERNEL

(75) Inventor: Waldemar Kunysz, Calgary (CA)

(73) Assignee: NovAtel Inc., Calgary (CA)

( * ) Notice: Subject to any disclaimer, the term of this patent is extended or adjusted under 35 U.S.C. 154(b) by 1031 days.

(21) Appl. No.: 11/738,175

(22) Filed: Apr. 20, 2007

(65) Prior Publication Data

US 2007/0248145 A1 Oct. 25, 2007

Related U.S. Application Data

(60) Provisional application No. 60/794,736, filed on Apr. 25, 2006.

(51) Int. Cl.
*H04B 1/69* (2011.01)
*H04B 1/00* (2006.01)

(52) U.S. Cl. ........................................ 375/130; 375/142

(58) Field of Classification Search .................. 375/138, 375/130, 137, 295, 375, 256, 142, 143, 150, 375/152, 316, 340, 343; 455/114.1
See application file for complete search history.

(56) References Cited

U.S. PATENT DOCUMENTS

| | | | | |
|---|---|---|---|---|
| 6,845,253 B1 * | 1/2005 | Schantz | ..................... | 455/575.7 |
| 7,020,224 B2 | 3/2006 | Krivokapic | | |
| 7,079,604 B1 * | 7/2006 | Miller et al. | ................... | 375/343 |
| 7,103,109 B2 * | 9/2006 | Nakache et al. | .............. | 375/295 |
| 7,292,619 B2 * | 11/2007 | Molisch et al. | ............... | 375/137 |
| 7,298,792 B2 * | 11/2007 | Nakache et al. | .............. | 375/295 |
| 7,349,458 B2 * | 3/2008 | Gezici et al. | ................ | 375/138 |
| 2003/0025631 A1 * | 2/2003 | Kim | .............................. | 342/198 |
| 2003/0198308 A1 * | 10/2003 | Hoctor et al. | ................. | 375/354 |
| 2003/0227984 A1 * | 12/2003 | Batra et al. | ..................... | 375/340 |
| 2004/0151269 A1 * | 8/2004 | Balakrishnan et al. | ....... | 375/355 |
| 2004/0174925 A1 * | 9/2004 | Sanada | ......................... | 375/130 |
| 2004/0198260 A1 * | 10/2004 | Molisch et al. | ............ | 455/114.1 |
| 2004/0233889 A1 * | 11/2004 | Fujita et al. | .................... | 370/350 |
| 2005/0175068 A1 * | 8/2005 | Nakache et al. | .............. | 375/130 |

OTHER PUBLICATIONS

Nakache, Y.P, Molisch, A.F., "Spectrual Shape of UWB Signals Influence of Modulation Format, Multiple Access Scheme and Pulse Shape", TR-2003-40, May 2003, Cambridge, MA.

* cited by examiner

*Primary Examiner* — Aristocratis Fotakis
(74) *Attorney, Agent, or Firm* — Cesari and McKenna, LLP; Patricia A. Sheehan

(57) ABSTRACT

A system and method is provided for improving the operating range for UWB communication systems by increasing the margin between true correlation peaks and false correlation peaks in a received UWB signal. A received signal is first correlated with a UWB kernel before being correlated with the PRN code. The UWB kernel is a very short UWB pulse having the same pulse shape as the UWB signal pulses. By pre-correlating the received signal with the UWB kernel at least once prior to correlating with the PRN code, the margin between true correlation peaks and false correlation peaks is substantially improved.

12 Claims, 17 Drawing Sheets

ENHANCED ULTRA WIDE BAND SIGNAL DETECTION USING AN ULTRA WIDE BAND KERNEL

CROSS REFERENCE TO RELATED APPLICATIONS

This application claims priority to U.S. Provisional Patent Application No. 60/794,736 filed on Apr. 25, 2006.

FIELD OF INVENTION

The invention relates generally to Ultra Wide Band (UWB) receivers and, more particularly, to improving separation of correlation peaks from noise in a received UWB signal.

BACKGROUND

An Ultra Wide Band (UWB) signal occupies a wide frequency range due to its narrow pulse width. Various signal shapes can be used in order to meet frequency band restrictions and transmitter/receiver design requirements. The UWB signals are normally difficult to distinguish from noise. Various modulation schemes are used to detect and track a UWB signal and distinguish the signal from noise in a UWB receiver.

One such technique is to multiply the UWB pulse train by a synchronized, unique pseudo-random noise (PRN) code in the UWB transmitter. By correlating a received signal with the same code in a UWB receiver, the UWB signal train can be detected and recovered from noise. The signal output from a correlator includes a series of peaks in which some are "true" cross-correlation peaks representing a transmitted pulse, and others are "false" cross-correlation peaks representing signal noise. The "true" cross-correlation peaks are higher than the false peaks by some margin. The margin is determined by the length of the PRN code, the orthogonality properties of the code and how much noise and interference is present in the incoming signal. The operating range for UWB systems can be limited because the "safety margin," that is, the margin between the true and false correlation peaks, quickly vanishes with distance due to propagation loss and multi-path loss.

SUMMARY

The present invention provides a system and method for improving the operating range for UWB communication systems by increasing the safety margin between true correlation peaks and false correlation peaks in a received UWB signal. A received signal is first correlated with a "UWB kernel" before being correlated with the PRN code. The UWB kernel is a very short UWB pulse having the same pulse shape as the UWB signal pulses. By "pre-correlating" the received signal with the UWB kernel at least once prior to correlating the signal with the PRN code, the safety margin between true correlation peaks and false correlation peaks is substantially improved.

BRIEF DESCRIPTION OF THE DRAWINGS

The invention description below refers to the accompanying drawings, of which.

DETAILED DESCRIPTION

The safety margin between "true" correlation peak and "false" correlation peaks in a received UWB signal that is correlated with a PRN code can be improved by first cross-correlating the incoming signal with a very short UWB pulse, which is referred to herein as a "UWB Kernel." The UWB kernal illustratively has the same shape as a transmitted UWB signal pulse. The cross-correlation with the UWB kernal is referred to herein as "pre-correlation."

According to an illustrative embodiment, a receiver applies the UWB Kernel to the received signal N times to essentially "filter" the narrow UWB pulses from the incoming "noisy" signal before the receiver cross-correlates the signal with the PRN code. A significant improvement in signal to noise ratio has been found using the pre-correlation. Accordingly, relatively weak UWB signals can be detected in the presence of noise and interference and additional range may obtained using the pre-correlation technique.

Figure 1:
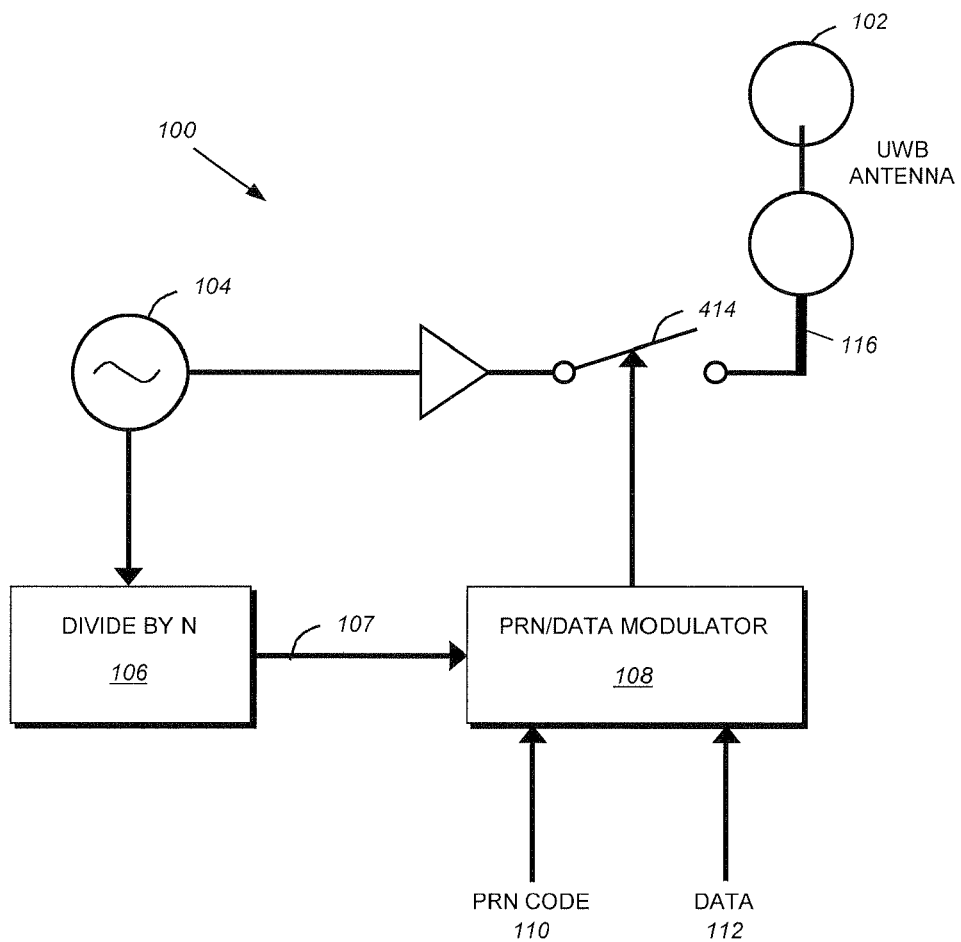
FIG. 1 is a schematic diagram of a UWB transmitter including a UWB antenna.
Figure 17:
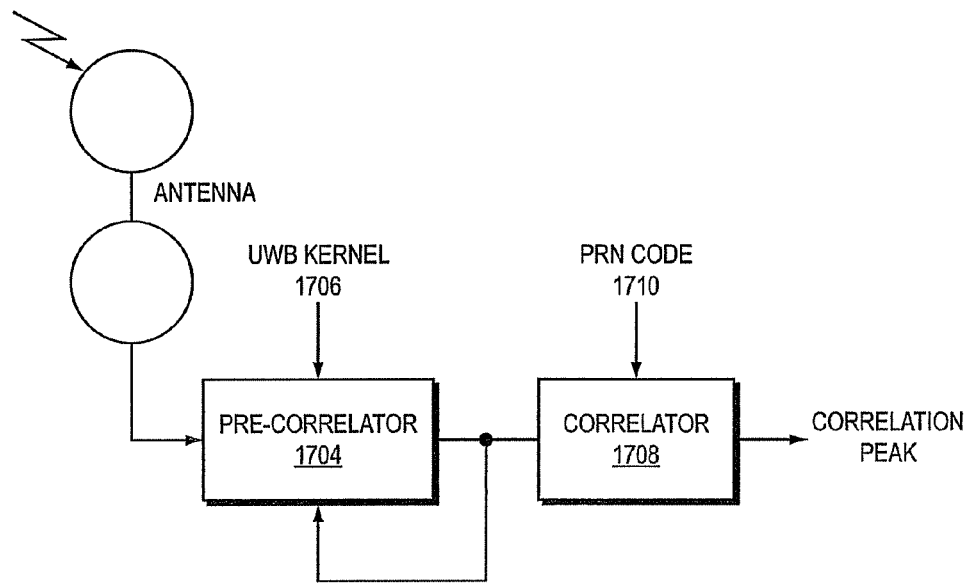
FIG. 17 is a functional block diagram of an illustrative UWB receiver and FIG. 18 is a functional block diagram of an alternative embodiment of the UWB receiver.
Figure 18:
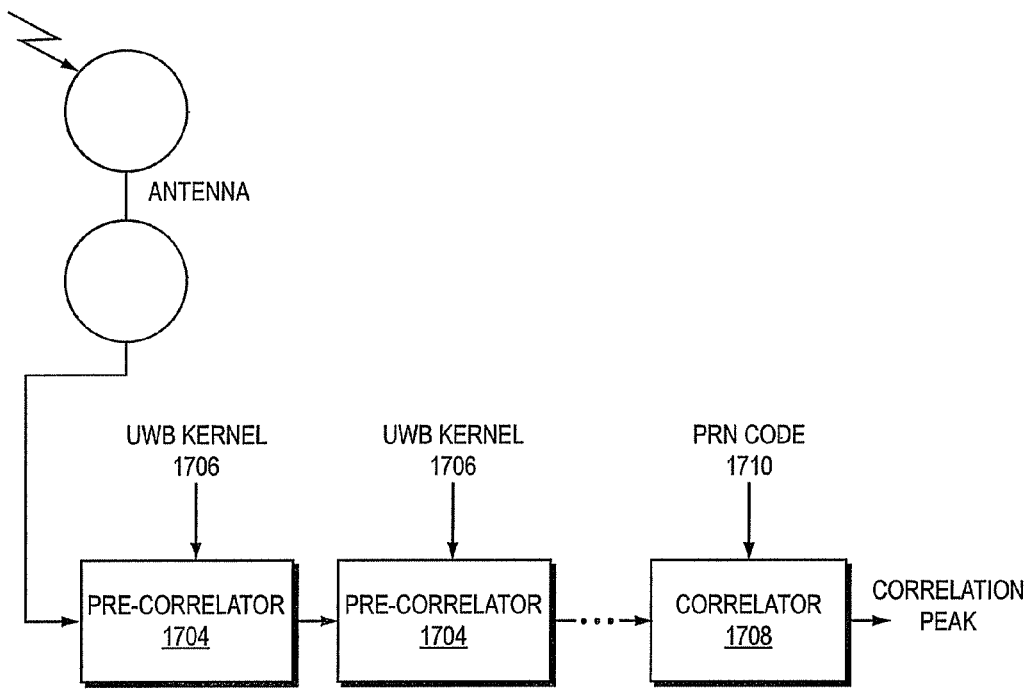

The illustrative transmitter depicted in FIG. 1 and receiver depicted in FIG. 17 use a novel UWB dual sphere antenna configuration 102 which is described in a co-pending U.S. patent application Ser. No. 11/693,880 entitled Dual Sphere Ultra Wide Band Antenna. However other antennas may be used to transmit and receive the UWB signals.

FIG. 1 is a schematic diagram of a UWB transmitter 100 driving a dual sphere UWB antenna 102. A continuous wave (CW) input signal provided by a generator 104 is modulated by a pseudo-random noise (PRN)/Data Modulator 108. The input signal is fed through a divide by N module 106 to produce a modulation signal that has a frequency that is suitable for input to the PRN/Data Modulator 108. A PRN code on line 110 and a data signal on line 112 are also input to the PRN/Data Modulator 108. In response to the modulation signal, the PRN code 110 and the data 112, the PRN/Data Modulator controls switching circuitry 114 to produce pulses of the continuous wave signal. The pulses are communicated to the antenna 102 via a transmission line 116.

Figure 2:
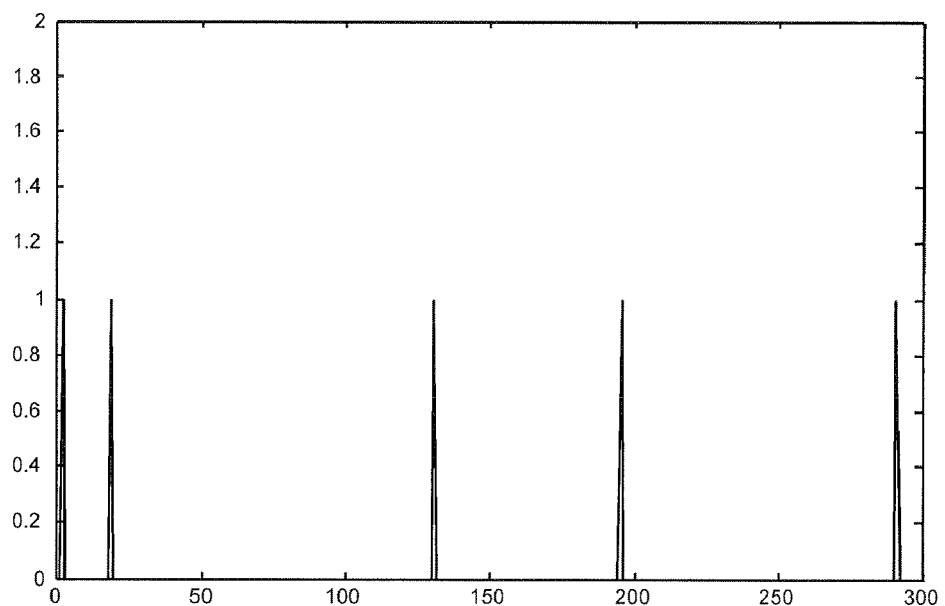
FIG. 2 is a graph of an illustrative PRN code sequence.
Figure 3:
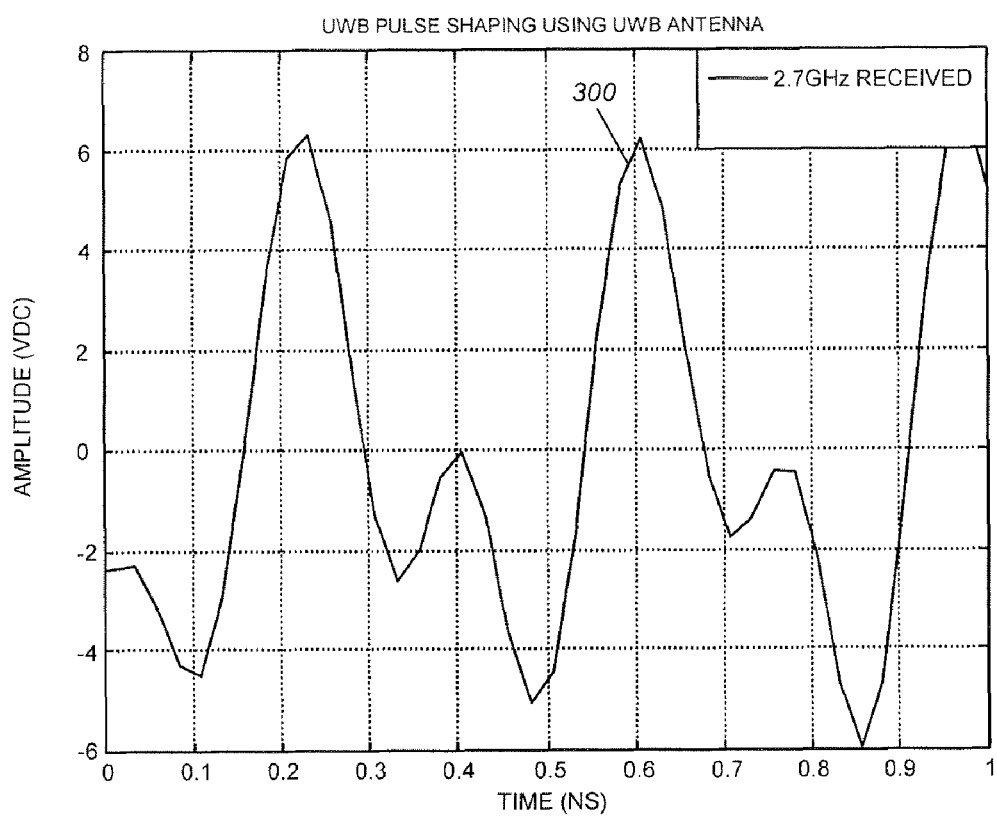
FIG. 3 is a graph of UWB signal amplitude versus time for an illustrative UWB signal.
Figure 4:
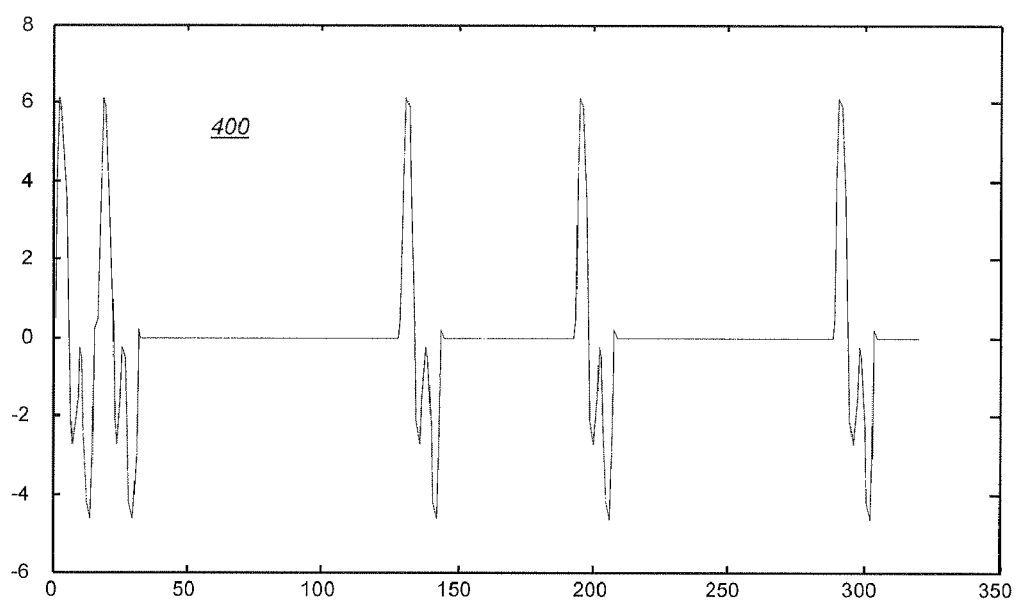
FIG. 4 is a graph of a UWB pulse train modulated with a PRN sequence.

A sample of a PRN sequence 200, is shown in FIG. 2. The PRN sequence 200 is illustratively applied to a 2.7 GHz signal, such as signal 300 shown in FIG. 3 and the resultant PRN modulated UWB signal 400 is shown in FIG. 4. The signal shown in FIG. 4 may be produced by the UWB transmitter 100 shown in functional block diagram form in FIG. 1.

Figure 5:
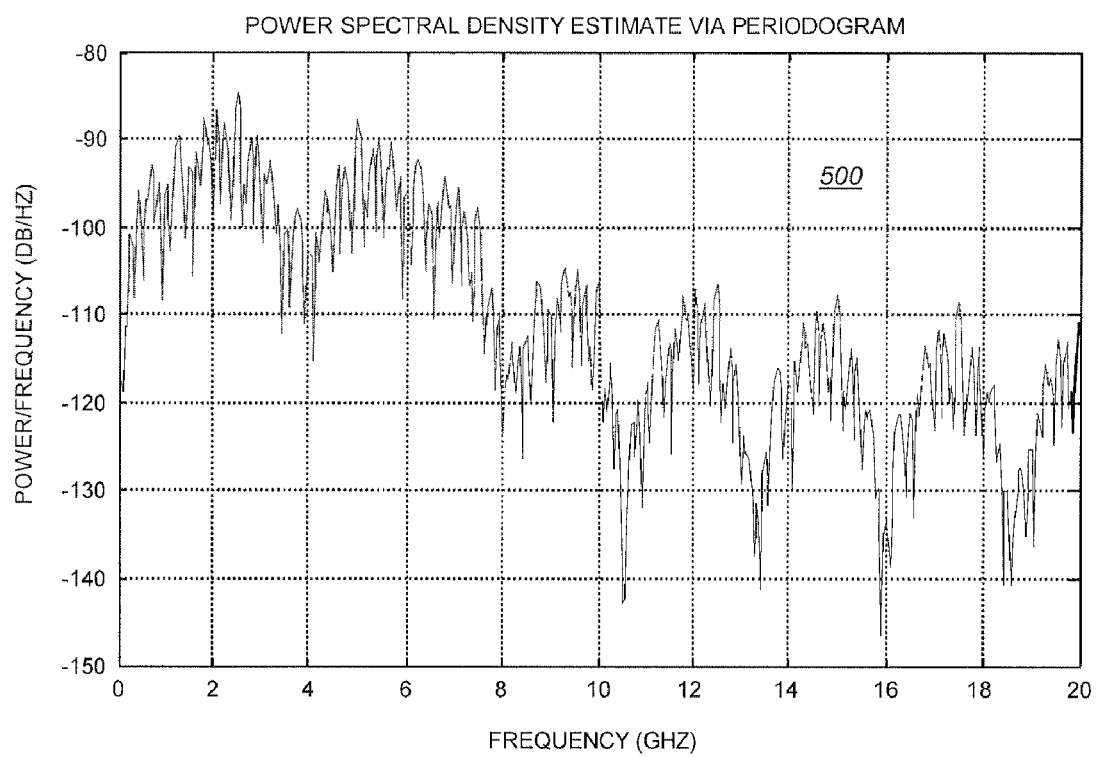
FIG. 5 is a graph of the power spectral density of a UWB pulse train modulated with a PRN sequence.
Figure 6:
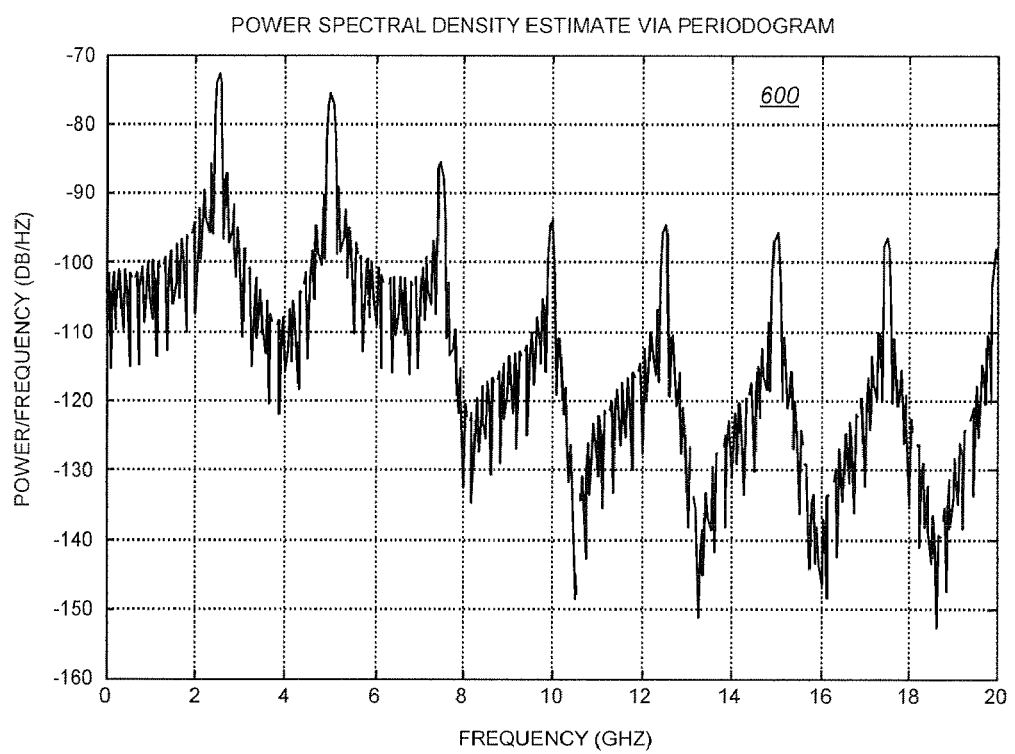
FIG. 6 is a graph of the power spectral density of illustrative uniformly spaced UWB pulses.

The sending of the UWB pulses modulated with the PRN sequence causes the power spectral density to be more uniformly distributed over the frequency range, by preventing the build up of spectral lines. FIG. 5 shows an estimated power spectral density 500 of the PRN modulated UWB signal 400. This is in contrast to the power spectral density 600 of UWB pulses transmitted uniformly, as illustrated in FIG. 6 which shows the grouping of spectral lines in the power spectral density of uniformly spaced UWB pulses.

Figure 7:
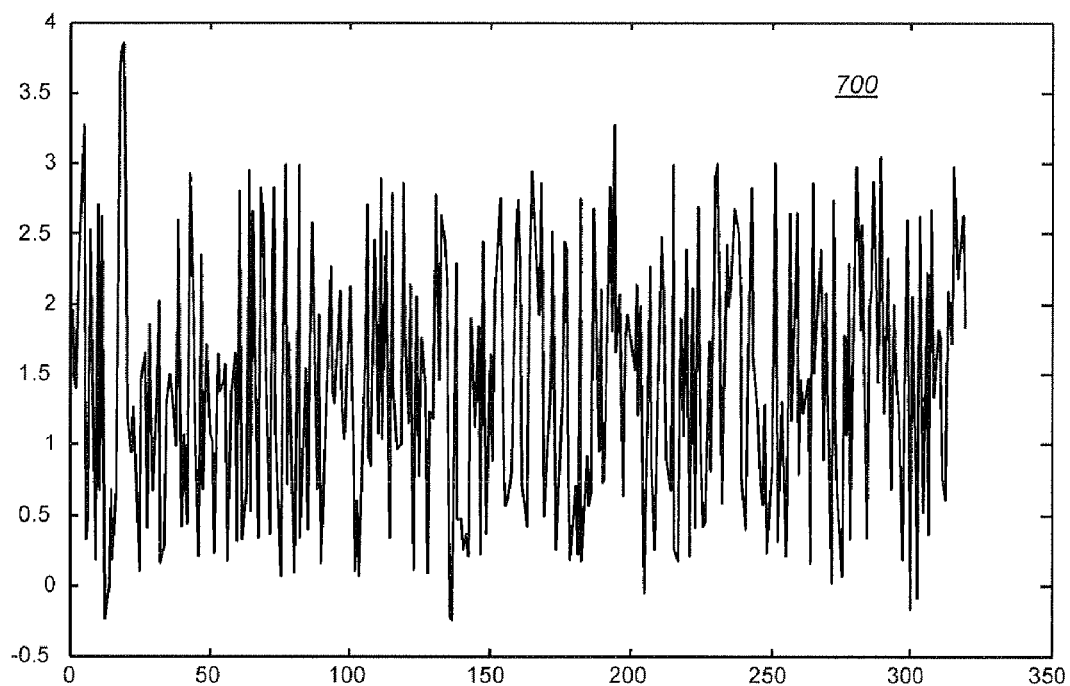
FIG. 7 is a graph of a UWB pulse train with added noise.
Figure 8:
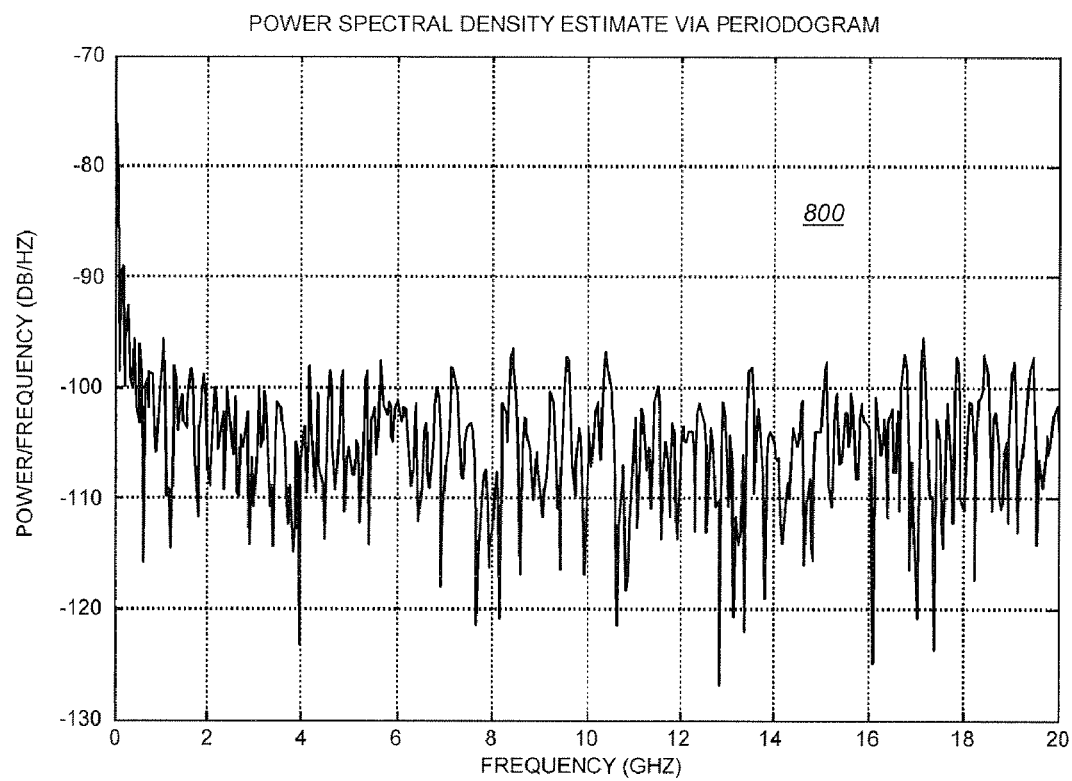
FIG. 8 is a graph of the power spectral density of a UWB pulse train with added noise.

The PRN modulated UWB signal 400 shown in FIG. 4 does not include a noise component. When 10 dB of noise is added to the signal 400 the UWB signal is indistinguishable from the noise. FIG. 7 illustrates a noisy signal 700 including a PRN modulated UWB pulse train 10 dB added noise. FIG. 8 is a graph of the power spectral density 800 of the UWB pulse train with 10 dB added noise.

Figure 9:
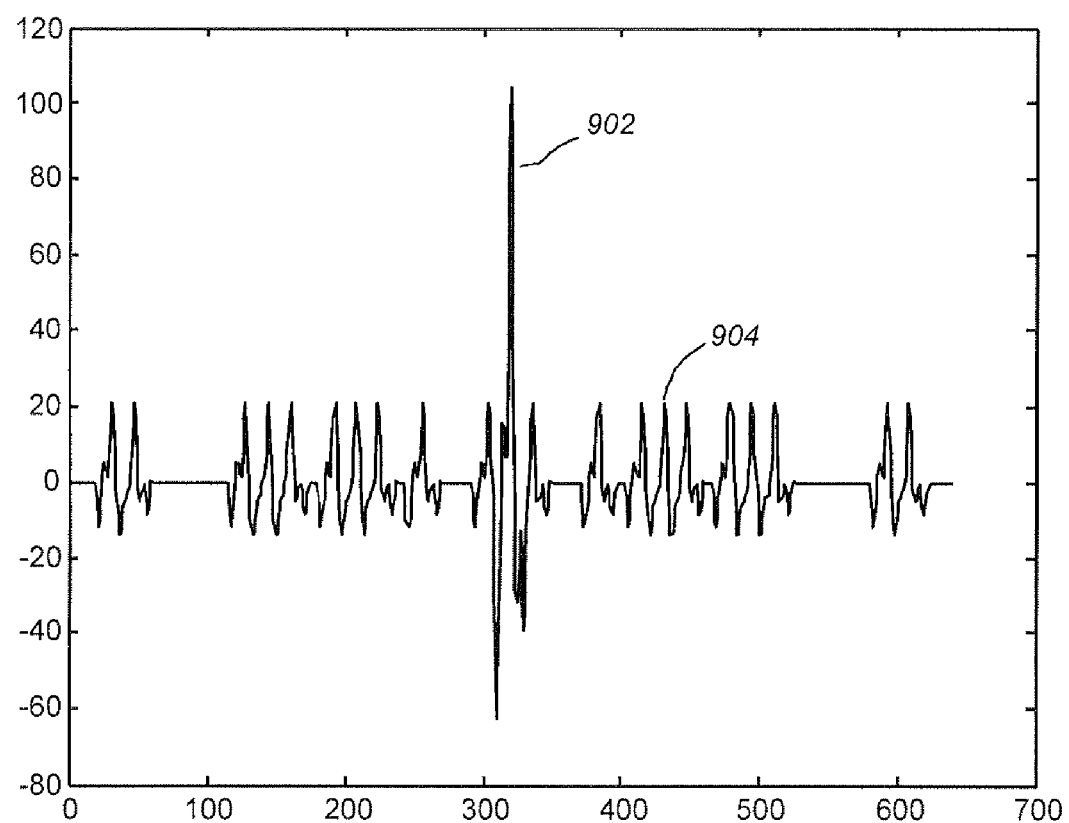
FIG. 9 is a graph of cross-correlation peaks of a PRN sequence with a noise-free UWB pulse train.

A common approach for signal detection using a PRN sequence is to cross-correlate the incoming signal with a copy of the PRN sequence. As shown in FIG. 9, the result of cross-correlating the noise-free PRN modulated UWB signal 400 (shown in FIG. 4) with the PRN sequence 200 (shown in FIG. 2) is a clear correlation peak 902 separated from false peaks 904 by a substantial margin. The ratio between the cross-correlation peak and the false peaks is about 14 dB. In other words, there is a 14 dB safety margin between the "true" correlation peak and "false" correlation peaks.

Figure 10:
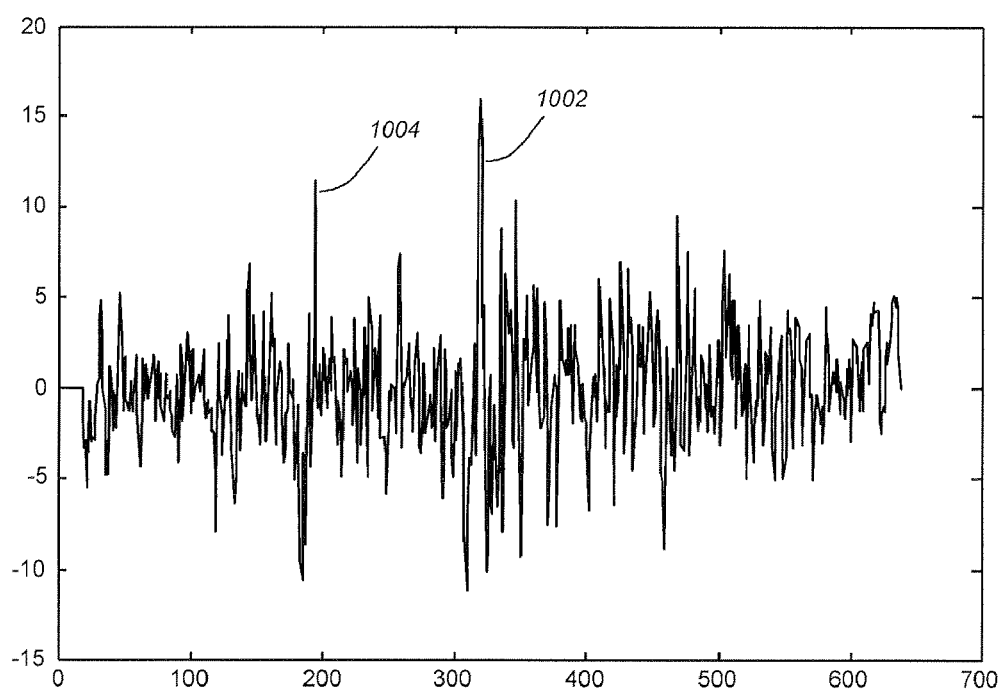
FIG. 10 is a graph of cross-correlation peaks of a PRN sequence with a UWB pulse train in the presence of 10 dB noise.

FIG. 10 illustrates the result of cross-correlating the noisy PRN modulated UWB signal 700 (shown in FIG. 7) with the PRN sequence 200 (shown in FIG. 2). The margin between the true correlation peak 1002 and a false correlation peak 1004 in the cross-correlated noisy signal is less than 3 dB. This decreased safety margin significantly diminishes the receiver range and performance.

Figure 11:
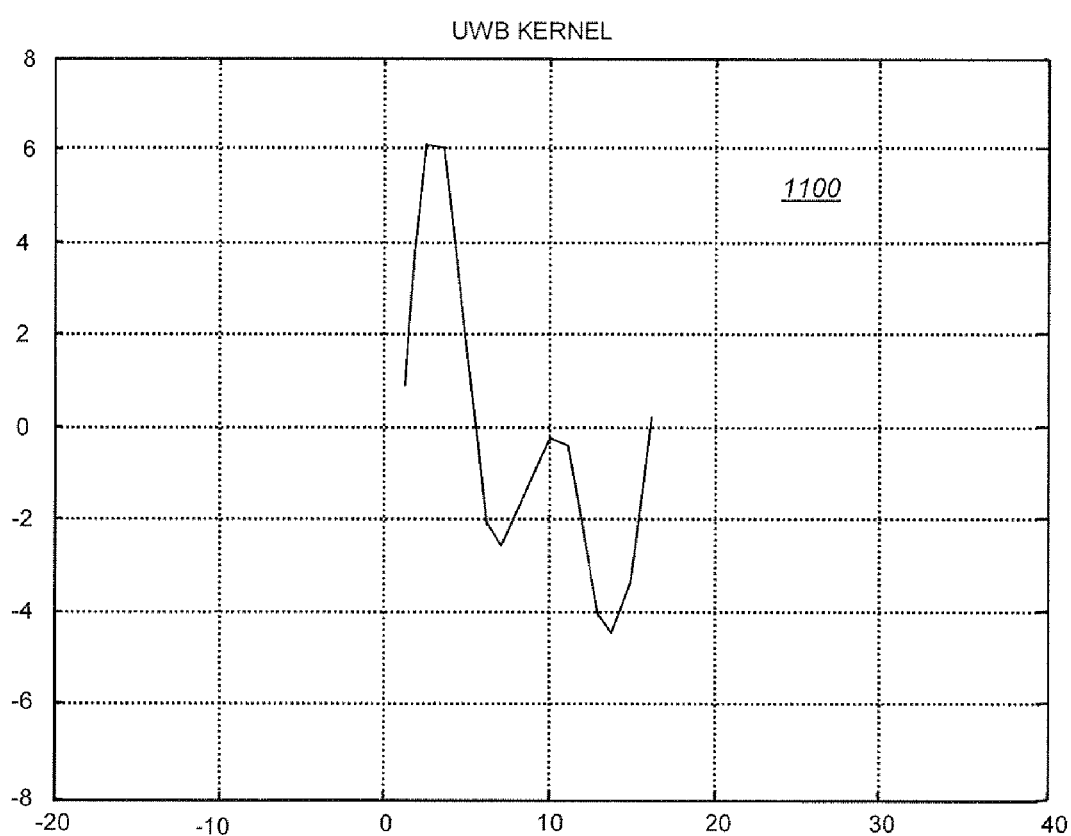
FIG. 11 is a graph of an illustrative UWB kernal.

One known method for increasing the safety margin is to utilize a much longer PRN sequence. However, increasing the PRN sequence length reduces the effective data rate and requires more complex transmitters and receivers. Instead, the inventive receiver performs a pre-correlation step in which a short UWB pulse, referred to herein as a UWB kernal, is correlated with the signal before the PRN sequence is used for cross-correlation. FIG. 11 shows an illustrative UWB kernal 1100 which is a very short UWB pulse in the shape of the transmitted UWB pulses. The UWB kernal pre-correlation essentially acts to "filter" the UWB pulse train from the noise.

Figure 12:
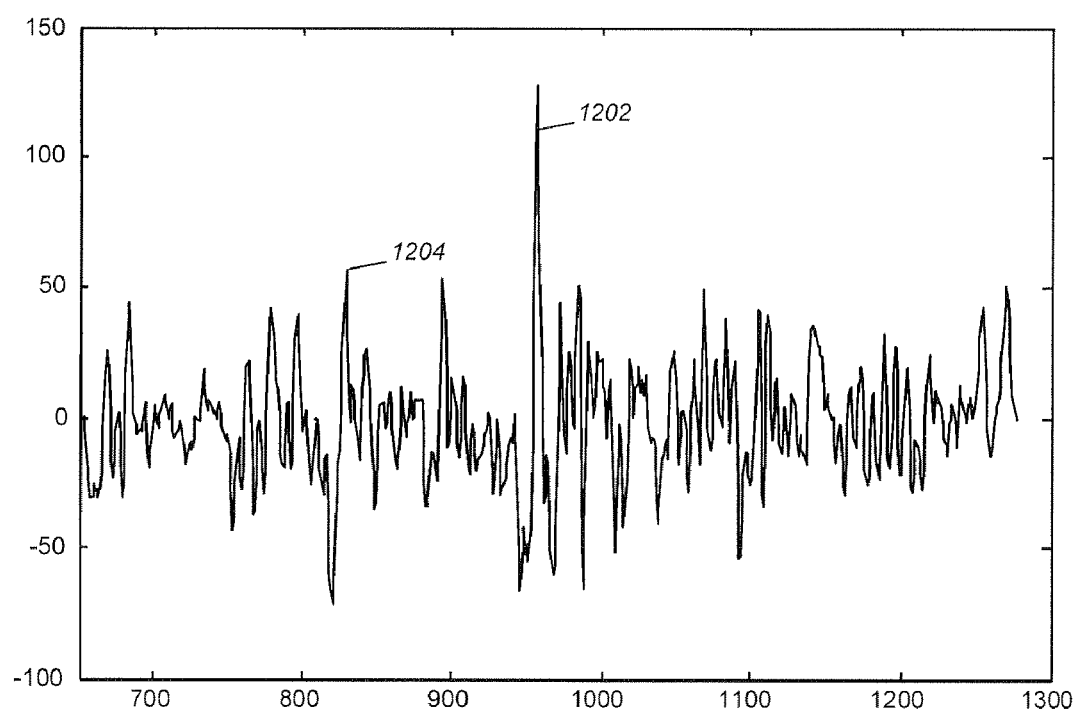
FIG. 12 is a graph of cross-correlation peaks of a PRN sequence with a UWB pulse train in the presence of 10 dB noise pre-correlated once with a UWB kernal.

The result of correlating the UWB kernal 1100 with the noisy signal 700 shown in FIG. 7 and then cross-correlating the signal with the PRN code 200 shown in FIG. 2 is an improved safety margin between the true correlation peak 1202 and false peak 1204 shown in FIG. 12. The step of pre-correlating with the UWB kernal 1100 improves the safety margin from about 2.5 dB to about 7 dB.

Figure 13:
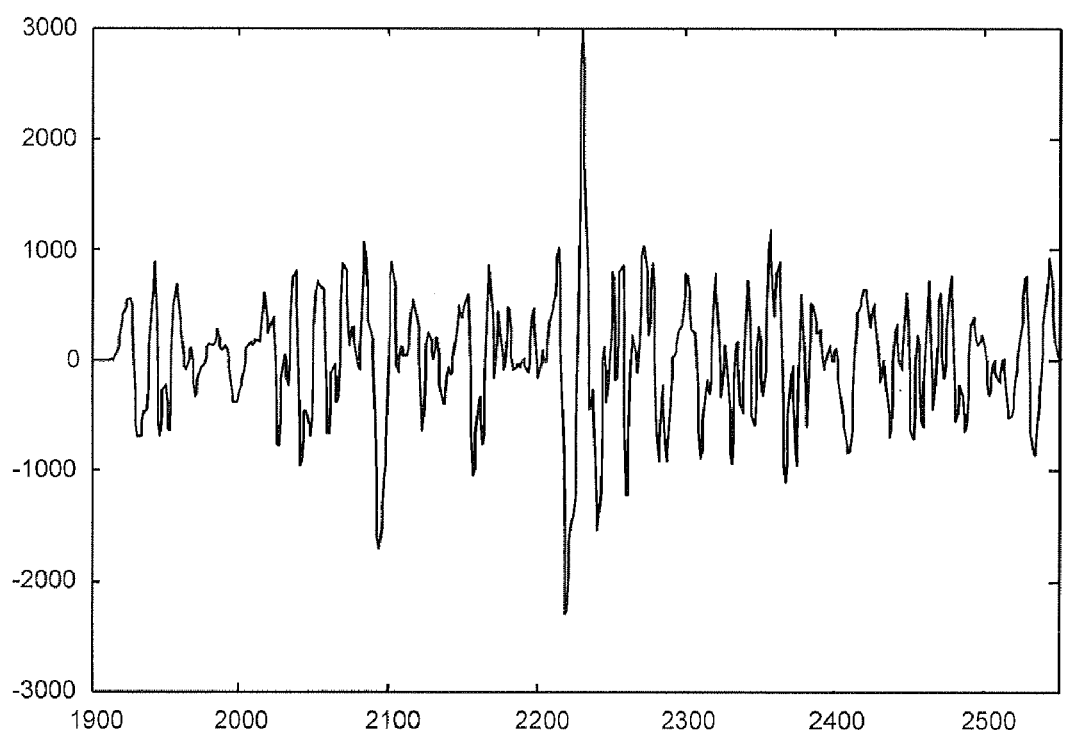
FIG. 13 is a graph of cross-correlation peaks of a PRN sequence with a UWB pulse train in the presence of 10 dB noise pre-correlated twice with a UWB kernal

An alternative embodiment of the inventive UWB receiver pre-correlates the received signal with a UWB kernal 1100 multiple times before cross-correlating the signal with the PRN code 200. In the preferred embodiment, the UWB receiver pre-correlates the received signal 700 with the UWB kernal 1100 twice before cross-correlating the signal with the PRN code 200. The results of applying the UWB kernal twice to the signal and cross-correlating the signal with the PRN code is shown in FIG. 13. Note that the safety margin has improved to 8.8 dB. While the UWB kernal may be applied additional times, at some point the application of the UWB kernal results in shaping the noise to look more like the UWB pulse, and thus, adversely affects the margin that was achieved in the previous pre-correlation step.

Figure 14:
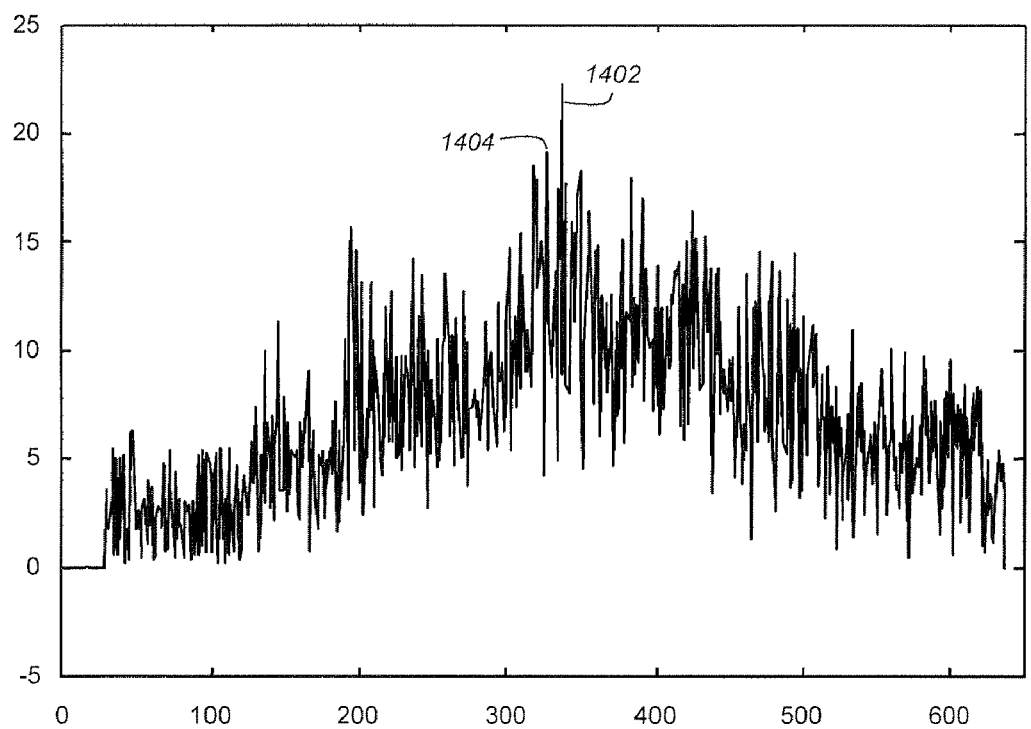
FIG. 14 is a graph of cross-correlation peaks of a PRN sequence with a UWB pulse train in the presence of 15 dB noise.
Figure 15:
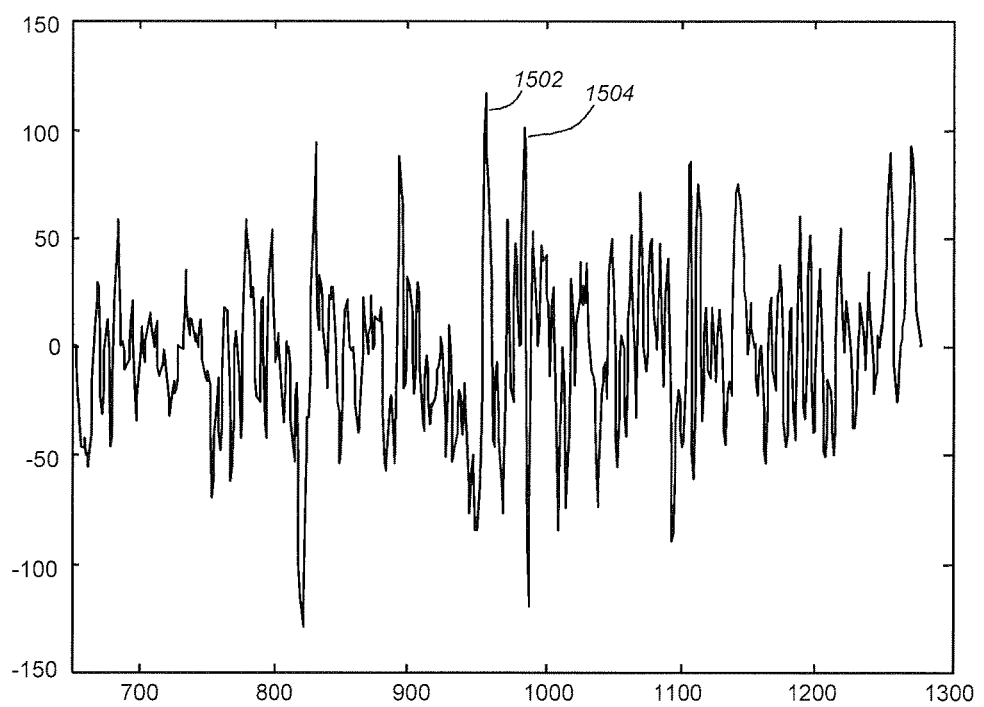
FIG. 15 is a graph of cross-correlation peaks of a PRN sequence with a UWB pulse train in the presence of 15 dB noise pre-correlated once with a UWB kernal.
Figure 16:
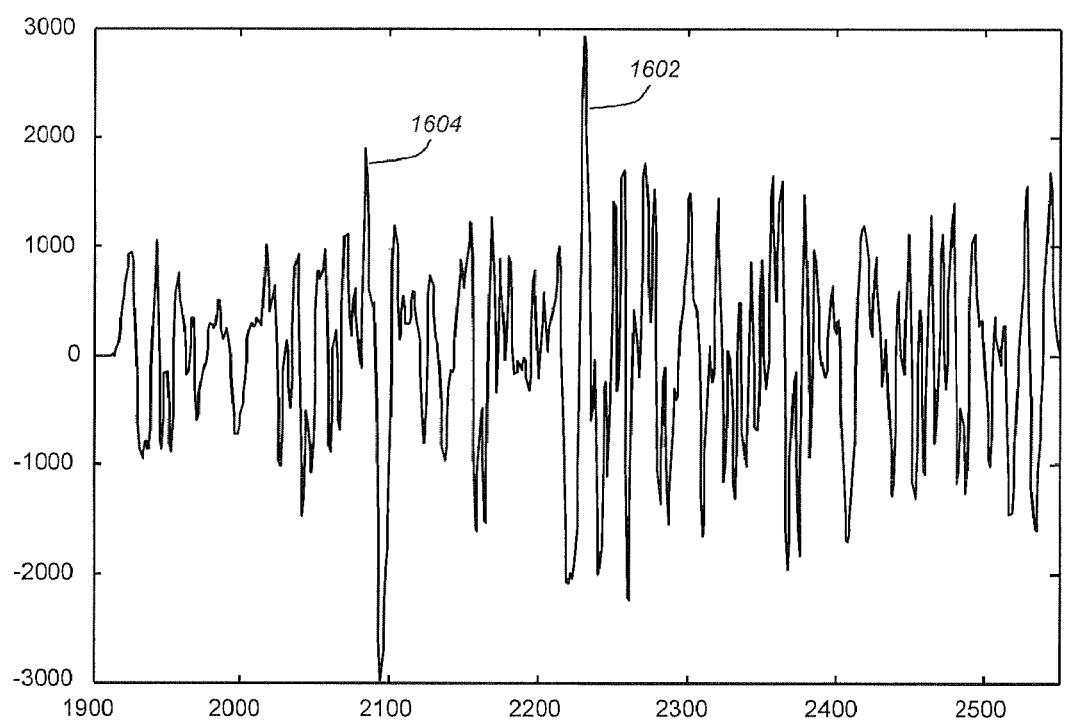
FIG. 16 is a graph of cross-correlation peaks of a PRN sequence with a UWB pulse train in the presence of 15 dB noise pre-correlated twice with a UWB kernal.

The effect of pre-correlating a received PRN modulated UWB signal that includes 15 dB of noise is illustrated with reference to FIGS. 14-16. FIG. 14 illustrates the result of cross-correlating the noisy PRN modulated UWB signal with a PRN code in the receiver without performing a pre-correlation in accordance with the inventive method. A very small safety margin results between the true correlation peak 1402 and false correlation peak 1404. FIG. 15 illustrates the result of cross-correlating the same noisy UWB signal with the same PRN code in the receiver after once pre-correlating the received signal with a UWB kernal 1100. The margin between true peak 1502 and false peak 1504 is substantially improved (note the different scales in the two figures). FIG. 16 illustrates the result of cross-correlating the same noisy UWB signal with the same PRN code in the receiver after twice pre-correlating the received signal with a UWB kernal 1100. The margin between true peak 1602 and false peak 1604 is substantially improved over the margin shown in FIG. 15. Applying the UWB kernal a third time did not raise the safety margin appreciatively.

FIG. 17 is a schematic diagram of a UWB receiver according to an illustrative embodiment of the invention. A UWB antenna 1702 receives a signal including noise and a PRN encoded UWB signal. A pre-correlator 1704 correlates the received signal "n" times with a UWB kernal 1706. Although the embodiment illustrated in FIG. 7 shows a single pre-correlator which performs n correlations, it should be understood that a series of n separate pre-correlators 1704 could also be used in series wherein each separate pre-correlator performs one correlation with a UWB kernal within the scope of the present invention. A correlator 1708 receives the pre-correlated signal from the pre-correlator(s) 1704 and correlates the pre-correlated signal with the PRN code 1710. The correlator outputs correlation peaks with an improved safety margin so that the UWB receiver can accurately locate UWB pulses in the received signal.

Although embodiments are described herein with respect to PRN modulated pulses, persons having ordinary skill in the art should appreciate that the present invention can also be implemented wherein the UWB pulses are encoded using alternate modulation techniques. For example, it is envisioned that a pulse position modulated (PPM) UWB signal can be pre-correlated in a UWB receiver to improve the associated safety margin within the scope of the present invention.

While the invention has been described with reference to various illustrative embodiments, it should be understood by those skilled in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method comprising:
    receiving an ultra wide band (UWB) signal including pseudo-random noise (PRN) encoded information;
    correlating the UWB signal with a UWB kernel that consists of a UWB pulse having a pulse shape substantially identical to a pulse shape of a transmitted UWB pulse to generate a pre-correlated signal;
    correlating the pre-correlated signal with the UWB kernel for a second time prior to correlating the pre-correlated signal with the PRN code;
    correlating the pre-correlated signal with the PRN code to locate UWB pulses in the UWB signal; and
    outputting the located UWB pulses.

2. The method of claim 1, comprising:
    correlating the pre-correlated signal with the UWB kernel at least a third time prior to correlating the pre-correlated signal with the PRN code.

3. The method of claim 1, wherein the UWB kernel consists of a short duration UWB pulse.

4. The method of claim 1, comprising:
    modulating a UWB signal using a PRN code to generate a modulated UWB signal;
    communicating the modulated UWB signal to a first UWB antenna for transmission;
    receiving the modulated UWB signal by a second UWB antenna.

5. An ultra side band (UWB) communication system comprising:
    a UWB receiving antenna;
    two pre-correlators connected to the UWB receiving antenna, the pre-correlators configured to correlate a UWB signal received from the UWB receiving antenna with a UWB kernel that consists of UWB pulse having a pulse shape substantially identical to a pulse shape of a transmitted UWB pulse to generate a pre-correlated signal, wherein the two pre-correlators are connected in series and a first pre-correlator correlates the UWB signal received from the UWB receiving antenna with the UWB kernel and the second pre-correlator correlates a signal received from the first pre-correlator with the UWB kernel to generate the pre-correlated signal; and
    a correlator connected to the pre-correlators, the correlator configured to correlate the pre-correlated signal with a pseudo-random noise (PRN) code in order to locate the UWB pulses.

6. The UWB communication system of claim 5, further including a third pre-correlator connected in series with the two pre-correlators, wherein the third pre-correlator correlates a signal received from the second pre-correlator with the UWB kernel to generate the pre-correlated signal.

7. The UWB communication system of claim 5, further including n pre-correlators connected in series with the two pre-correlators correlate the pre-correlated signal with the UWB kernel before the pre-correlated signal is provided to the correlator, where n is an integer.

8. The UWB communication system of claim 5, comprising:
    UWB modulation circuitry configured to modulate a UWB signal with the PRN code; and
    a UWB transmitting antenna connected to the UWB modulation circuitry and transmitting the PRN modulated UWB signal from the UWB transmitting antenna.

9. The UWB communication system of claim 5 wherein the UWB receiving antenna is a dual-sphere antenna.

10. The UWB communication of claim 8 wherein the UWB transmitting antenna is a dual sphere antenna.

11. A method comprising:
    receiving an ultra wide band (UWB) signal including modulation code encoded information;
    correlating the UWB signal with a UWB kernel that consists of a UWB pulse having a pulse shape substantially identical to a pulse shape of a transmitted UWB pulse to generate a pre-correlated signal;
    correlating the pre-correlated signal with the UWB kernel for a second time prior to correlating the pre-correlated signal with the modulation code;
    correlating the pre-correlated signal with the modulation code to locate UWB pulses in the UWB signal; and
    outputting the located UWB pulses.

12. The method of claim 11, comprising:
    correlating the pre-correlated signal with a UWB kernel signal at least a third time prior to correlating the pre-correlated signal with the modulation code.

* * * * *

UNITED STATES PATENT AND TRADEMARK OFFICE
CERTIFICATE OF CORRECTION

PATENT NO. : 8,249,128 B2  
APPLICATION NO. : 11/738175  
DATED : August 21, 2012  
INVENTOR(S) : Waldemar Kunysz Page 1 of 1

It is certified that error appears in the above-identified patent and that said Letters Patent is hereby corrected as shown below:

Col. 2, line 32, delete "; and";  
Col. 5, line 33, delete "side" and insert --wide--; and  
Col. 6, line 35, after "kernel" insert --signal--.

Signed and Sealed this  
Twelfth Day of February, 2013

Teresa Stanek Rea  
*Acting Director of the United States Patent and Trademark Office*